Aug. 16, 1938.   J. B. CLAY ET AL   2,127,021
STANCHION
Filed July 8, 1937
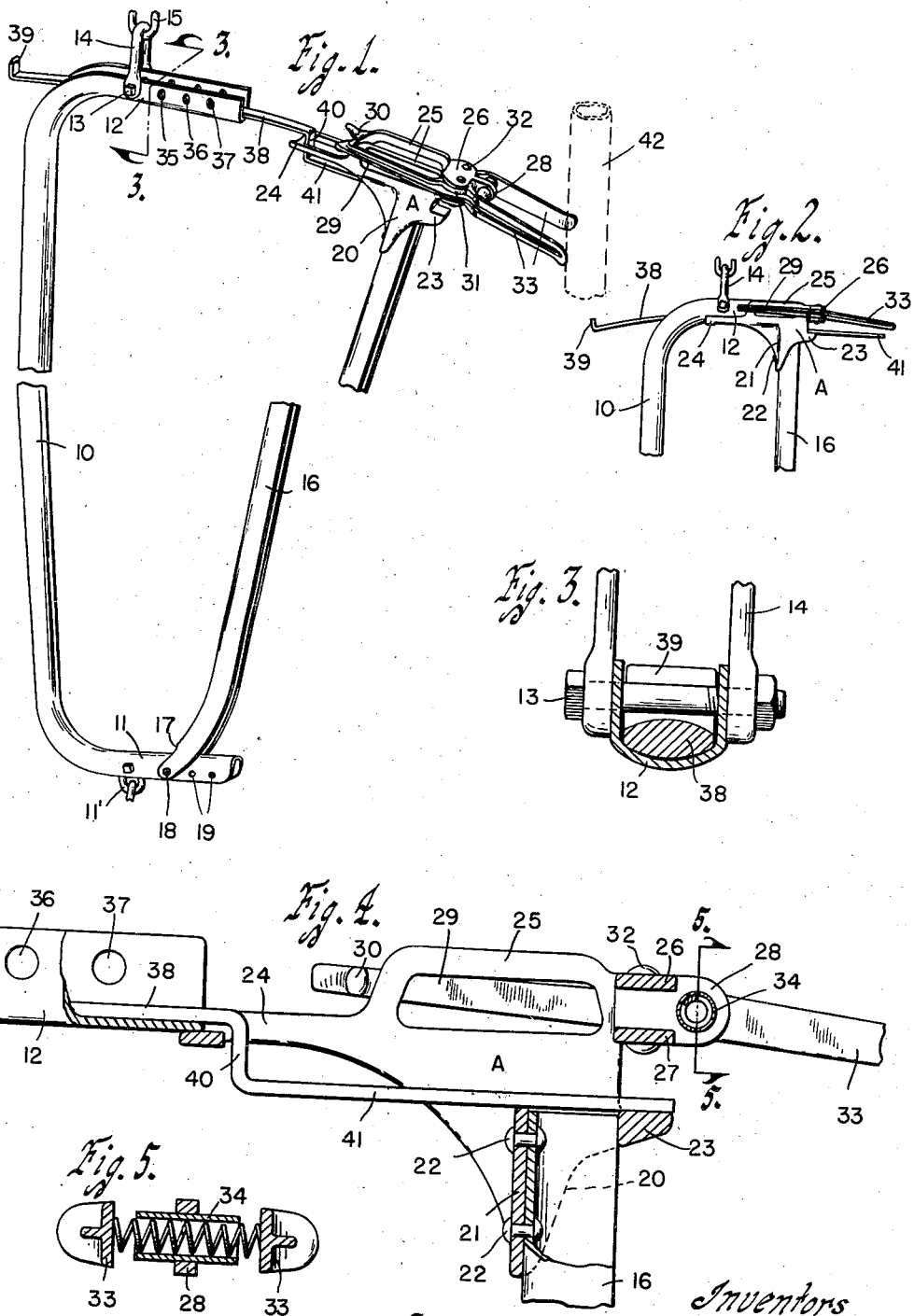
Witness
A. S. Munzenmaier
Inventors
Joseph B. Clay & Walter O. Wille
By Bair & Freeman
Attorneys Patented Aug. 16, 1938

2,127,021

UNITED STATES PATENT OFFICE 2,127,021

STANCHION

Joseph B. Clay and Walter O. Wille, Cedar Falls, Iowa, assignors to Clay Equipment Corporation, Cedar Falls, Iowa, a corporation of Iowa Application July 8, 1937, Serial No. 152,510

8 Claims. (Cl. 119—150)

Our present invention relates to an improvement in cattle stanchions.

It is our object to provide a cattle stanchion of sturdy and long-lived construction, which has a number of advantages.

In the first place, it is our object to provide such a stanchion having substantially upright stanchion bars so connected at the lower end that they may be adjusted for different spacings, and in any adjustment will have proper pivotal connection for cooperating with the structure at the top of the stanchion.

Another purpose is to provide a novel latching means at the stanchion top, whereby the movable stanchion bar may be connected with the so-called stationary bar in such manner that the parts will always properly cooperate and may be connected together in a variety of spacings for holding the animal.

Another object is to provide a novel arrangement of a slide operatively connected with the two upright stanchion bars, so as to allow them to freely spread and yet to limit the spreading movement. A further object is to provide latching means on one of the upright stanchion bars for relation with the other of them or with a head member on the other of them.

Still another object is to provide a novel form of latch device and mounting therefor.

With these and other objects in view, our invention consists in the construction, arrangement and combination of the various parts of our stanchion, whereby the objects contemplated are attained, as hereinafter more fully set forth, pointed out in our claims, and illustrated in the accompanying drawing, in which:

Figure 1 shows a perspective view of a stanchion embodying my invention arranged in open position.

Figure 2 is a rear elevation of the top part of the stanchion, the parts being in closed position.

Figure 3 is a detail, sectional view taken on the line 3—3 of Figure 1.

Figure 4 is a rear elevation of the latch mechanism at the top of the movable stanchion bar, parts being shown in vertical section and parts being omitted; and Figure 5 is a detail, sectional view taken on the line 5—5 of Figure 4.

In the accompanying drawing, we have shown what is sometimes called the stationary stanchion bar indicated by the numeral 10, made of an outwardly opening channel, having at its lower end an angular extension 11, forming what might be called the bottom of the stanchion.

A chain 11' may be secured to the portion 11 for anchoring the lower end of the stanchion to the barn floor.

At its upper end, the stanchion has a substantially right-angled extension comprising the member or part 12, which extends horizontally away from the stanchion bar proper in the form of an upwardly opening channel.

A bolt 13 is extended through the arms of the clevis 14 and through the walls of the head member 12 just described.

As shown in Figure 1, a chain 15 may be connected to this clevis for hanging the stanchion from above.

The movable stanchion member 16 is also made of an outwardly opening channel bar with a portion of its central web cut away as indicated at 17 at the lower end and its side flanges receiving the bottom member 11 and secured thereto by means of a bolt 18. The bolt 18 is extended through the walls of the stanchion member 16 and selectively through a pair of holes 19 in the member 11. By putting the bolt in the desired pair of holes 19, the width of the bottom of the stanchion may be regulated as desired.

We will now turn to the latch structure at the top of the stanchion.

At the upper end of the stanchion member 16 is a bracket indicated generally by the character A. In detail, the bracket A has a pair of spaced side walls 20 receiving between them the opposite sides of the stanchion member 16, as shown in Figures 1 and 4. These side walls 20 are integrally connected by a cross web 21 which fits against the central web of the stanchion member 16 and is secured thereto as by rivets 22.

On the outside of the member 16, the walls 20 are connected by an integral cross bar or plate 23.

Thus the upper end of the stanchion member 16 projects upwardly between the walls 20 and between the members 21 and 23, these walls forming a socket.

The walls 20 project above the upper end of the stanchion member 16 and then project forwardly somewhat and are connected at their inner ends by a horizontal yoke 24.

Each wall 20 has also at its upper part the guiding section 25. At the rear parts of the sections 25, they are connected by the upper and lower flat plate-like bars 26 and 27 from which projects still further rearwardly the upright flat plate-like member 28.

Outside the respective sections 25 are the members of a pair of latches 29 having in-turned hooks 30 at their inner ends. Each latch 29 is journaled as at 31 on a pintle 32 between the members 26 and 27 and has an outwardly extending handle 33.

Integral with the member 28 is a transverse sleeve 34 in which is received a coil spring, which projects beyond the sleeve and presses against the handles 33 and tends to hold them apart.

The latch members 29 and hooks 30 are so arranged that when the stanchion bar 16 is swung toward the stanchion bar 10, the hooks 30 will coact with a series of pairs of holes 35, 36, 37 in the walls of the head member 12 for locking the stanchion bars 10 and 16 together.

The front edges of the hooks 30 are beveled enough to cooperate with the ends of the walls of the head member during the movement of the parts toward locking position.

A slide bar 38 slides in the head 12 underneath the bolt 13. It has at its left-hand end as viewed in Figure 1, the up-turned flange 39, which functions to engage the bolt 13 and limit the movement of the slide bar 38 to the right. The slide bar 38 serves as a guide and limiting means. It has a down-turned portion 40 shown in Figure 1, which extends down past the connecting member of the yoke 24 and serves to engage that member as the stanchion member 16 swings open and to limit the opening movement of the stanchion bars.

From the portion 40, a portion 41 projects to the right between the walls 20 and above the portions 21 and 23 as shown in Figure 4.

In the practical use of a stanchion of this kind, the stanchion is hung by the chain 15 and anchored by the chain 11'. The bolt 18 is adjusted in the particular pair of holes 19 selected by the user according to the size of the animal to be kept in the stall, where the stanchion is installed.

When the animal is not in the stall, the stanchion is open as shown in Figure 1, except that ordinarily the handles 33 are allowed to swing a little farther open and ordinarily they coact with a post as indicated at 42 to keep the stanchion from rotating when it is open.

When the animal goes into the stall and puts its head through the stanchion, the cattleman can simply push on the stanchion bar 16 or on the handles 33 and push the member 16 toward closed position.

The hooks 30 of the latch members 29 can be caused to engage in any selected pair of holes 35, 36 or 37 according to the size of the animal to be held.

It is, of course, obvious that if one of the hooks should become disengaged, the other will still remain operative.

It is also obvious that the handles can be operated very conveniently and easily.

The device is therefore "cow proof" although it can be manipulated by the user with one hand.

The bars 16 are such that wood liners may be employed if desired.

The latch structure is a very simple, sturdy construction, and will stand up under hard usage without getting out of order.

One of the good features of this stanchion structure lies in the fact that the cattleman can grasp the bar 16 near the top without any danger of pinching his fingers. The body member A tends to keep him from getting his hand too close to the operative mechanism but in any event there are no parts projecting which are likely to pinch him. It will be obvious that in the closing movement of the movable stanchion bar, the yoke 24 is too far from the bar 16 to pinch the fingers and that the form of the body A tends to hold the hand down where there is no danger of catching the fingers in the parts 25 and the member 12.

One of the features that makes for convenience in operation and sturdiness in use, is the arrangement of the body or casting A with the loop 24 and guide sections (yokes) 25 and cross bar 23 as shown.

It will be noted that the upper surface of the cross member of the loop 24 is a little lower than the upper surfaces of the arms of the loop 24. Thus the arrangement of these parts just mentioned is such that altogether they form a channel to receive the free end of the head 12, as illustrated for instance in Figure 2. The cross member of the loop 24 rests beneath the head 12 and the arms of the loop and the yokes (side members) 25 of the casting or body A receive the head 12 between them so as to hold the head 12 and the body A in properly coacting positions and the latches are then required only to keep the bars 10 and 16 from movement apart. This makes a very effective locking or latching means.

We desire to cover by our claims hereto appended any modifications or use of mechanical equivalents or any changes in construction, shape and arrangement and combination of parts, which may reasonably come within the scope of such claims and within the spirit of our invention.

We claim as our invention:

1. In a stanchion, a relatively stationary bar having an angular extension at the top forming a head, in the form of an upwardly opening channel, said channel being provided with a plurality of latch retaining means, a relatively movable stanchion bar, and a holding apparatus having a body formed with a socket receiving and secured to the upper end of the movable stanchion bar, a portion of said body projecting toward the other bar and being provided with a transverse shoulder, said body having also laterally spaced upwardly extending side members, a slide bar connected with the head for limited sliding movement in said channel and slidably extended between said side members, and having a shoulder to engage and cooperate with said first shoulder, a pair of latches pivoted on said body arranged outside said side members, said latches having parts for cooperating with said first named means for locking the two bars together, means tending to move the free ends of the latches toward latching position, and handles projecting from the latches away from the stanchion bars.

2. In a stanchion, a relatively stationary bar having an angular extension at the top forming a head, in the form of an upwardly opening channel, a relatively movable stanchion bar, and a holding apparatus having a body formed with a socket receiving and secured to the upper end of the movable stanchion bar, a portion of said body projecting toward the other bar and being provided with a transverse shoulder, said body having also laterally spaced upwardly extending members, and a slide bar connected with the head for limited sliding movement in said channel and slidably extended between said side members, and having a shoulder to engage and cooperate with said first shoulder, the channel and body having latching means adapted to coact and secure the stanchion bars in different positions of relative adjustment.

3. In a stanchion, a relatively stationary stanchion bar having a head provided with a plurality of latch engaging means, a relatively movable stanchion bar, and a holding apparatus including a body at the upper end of the movable stanchion bar, said body being formed with a portion projecting toward the other bar, provided with a transverse shoulder and with spaced upwardly extending side members, a slide bar connected with the head for limited sliding movement and slidably extended between the side members of the body and having a shoulder to coact with said first-named shoulder, and a pair of latches pivoted on said body to coact with said means arranged outside said side members.

4. In a stanchion, a relatively stationary stanchion bar having a head at its upper end, provided with a plurality of latch engaging means, a relatively movable stanchion bar, and a holding apparatus including a body at the upper end of the movable stanchion bar, having side members adapted to receive between them said head, and a cross member adapted to be below the head when the stanchion bars are moved together, latches pivoted to the body and arranged outside said side members with hooks projecting beyond the side members and adapted to coact with said means, said latch members having handles, means for normally tending to move the latch members to latching position, and a slide bar having limited slidable movement on said head and having limited slidable movement on said body and being provided with a shoulder to cooperate with said cross member when the stanchion bars are spread apart.

5. In a stanchion, substantially upright stanchion bars, having a pivotal connection at their lower ends, a slide bar having limited sliding movement with relation to the upper end of each of the upright bars, and cooperative latching means on the respective upright bars for holding them in several selected relatively spaced positions, one stanchion bar having a channel-shaped head having latching means and slidably receiving the slide bar and having a stop means for limiting the movement of the slide bar in one direction, said stop means being farther away from the other stanchion bar than the latching means of the channel-shaped head, the slide bar having a projection to coact with said stop means.

6. In a stanchion, a relatively stationary bar having an angular extension at the top forming a head in the form of an upwardly opening channel, said channel being provided with a plurality of latch engaging means, a relatively movable stanchion bar, and a holding apparatus having a body formed with a socket receiving and secured to the upper end of the movable stanchion bar, a portion of said body projecting toward the other bar and being provided with a transverse shoulder, said body having also laterally spaced upwardly extending side members, a fully floating slide and guide bar received with limited movement in said body and extending between said side members of the movable stanchion bar to keep said guide bar in fully floating position, said guide bar having an offset portion to engage said shoulder to limit the span between the stationary and movable stanchion bars when in open position, and latch apparatus on the body for coacting with said means.

7. In a stanchion, a relatively fixed stanchion bar, and a relatively movable stanchion bar, one bar having laterally spaced latch engaging means, the other bar having at its upper end a head with a laterally projecting substantially flat vertical plate-like number having a hole, and a pair of plate-like bars, latch members pivoted between the plate-like bars on the opposite sides of the plate-like member having handles, and a spring projecting through the hole and engaging the handles to normally press them apart.

8. In a stanchion, a relatively fixed stanchion bar and a relatively movable stanchion bar, said stanchion bars having coacting latching means, a floating slide bar slidable on both stanchion bars, the first stanchion bar and the slide bar having coacting means for limiting the movement of the slide bar in stanchion opening direction, the slide bar having a downward bend between its ends forming a shoulder, the other stanchion bar having a shoulder for coacting with the slide bar shoulder for limiting the opening movement of the movable stanchion bar.

JOSEPH B. CLAY.
WALTER O. WILLE.